United States Patent [19]

Malanga

[11] Patent Number: 5,064,918

[45] Date of Patent: Nov. 12, 1991

[54] ZIEGLER-NATTA POLYMERIZATION OF STYRENE MONOMER

[75] Inventor: Michael T. Malanga, Midland, Mich.

[73] Assignee: The Dow Chemical Company, Midland, Mich.

[21] Appl. No.: 661,719

[22] Filed: Feb. 27, 1991

Related U.S. Application Data

[63] Continuation of Ser. No. 407,168, Sep. 14, 1989, abandoned.

[51] Int. Cl.$^5$ ............................................. C08F 12/08
[52] U.S. Cl. ........................................ 526/77; 526/160; 526/161; 526/346; 585/251
[58] Field of Search ................. 526/77, 346, 160, 912; 585/251

[56] References Cited

U.S. PATENT DOCUMENTS

| | | | |
|---|---|---|---|
| 3,105,858 | 10/1963 | Kresge et al. | 585/259 |
| 3,112,301 | 11/1963 | Natta et al. | 526/159 X |
| 4,389,517 | 7/1983 | Priddy et al. | 526/64 |
| 4,614,729 | 9/1986 | Crawford et al. | 526/912 X |
| 4,680,353 | 7/1987 | Ishihara et al. | 526/160 |
| 4,822,936 | 4/1989 | Maurer et al. | 585/259 |

OTHER PUBLICATIONS

Polmerization by Organometallic Compounds, Reich et al., Interscience, N.Y., 407–408, 1966.
Simionescu et al., J. Polym. Sci., 15, 2497–2509 (1977).
Chang et al., J. Polym. Sci: Pt. A: Polym. Chem., 27, 989–997 (1989).
Kern, J. Poly. Sci.: Pt. A-1, 7, 621–631 (1969).

*Primary Examiner*—Fred Teskin

[57] ABSTRACT

A process for preparing improved yields of styrene polymers by means of polymerization with a Ziegler-Natta type polymerization catalyst wherein the styrene monomer is first contacted with a hydrogenating agent under hydrogenation conditions such that substantially all phenylacetylene contained in the monomer stream is hydrogenated and thereafter contacting with a Ziegler-Natta catalyst.

7 Claims, No Drawings

ZIEGLER-NATTA POLYMERIZATION OF STYRENE MONOMER

CROSS-REFERENCE TO RELATED APPLICATION

This is a continuation of application Ser. No. 407,168, filed Sept. 14, 1989, now abandoned.

BACKGROUND OF THE INVENTION

The present invention relates to an improved process for preparing styrene polymers by means of a Ziegler-Natta polymerization. More particularly the present invention relates to such an improved process resulting in increased catalyst efficiency and lifetime.

The polymerization of styrene monomer to prepare useful polymers by means of a Ziegler-Natta type polymerization has been previously disclosed in the art. In U.S. Pat. No. 4,680,353 the preparation of styrene polymers having a high syndiotactic configuration utilizing such a catalyst is disclosed.

In the practice of such processes the catalyst is normally exhausted during the polymerization and must be replenished. Because the catalyst is relatively expensive, commercially viable processes require improved yields of polymer. Thus it would be desirable to provide a process for polymerization of styrene monomer having improved catalyst efficiency and lifetime.

SUMMARY OF THE INVENTION

The present inventor has now discovered that phenylacetylene, which is present in the styrene monomer available through many commercial sources, adversely affects Ziegler-Natta polymerization catalysts to reduce catalyst lifetime and efficiency.

According to the present invention there is now provided a process for preparing improved yields of styrene polymers by means of a Ziegler-Natta type polymerization the steps of the process comprising:

a) providing a monomer stream comprising styrene and contaminating amounts of phenylacetylene:

b) contacting the monomer stream with a hydrogenating agent under hydrogenation conditions such that substantially all the phenylacetylene is hydrogenated without substantial hydrogenation of styrene:

c) contacting the monomer stream with a Ziegler-Natta catalyst under polymerization conditions, so as to cause at least partial polymerization of styrene; and d) recovering the resulting styrene polymer.

By careful selection of the hydrogenation conditions, substantially complete removal of phenylacetylene without substantial hydrogenation of styrene monomer can be obtained.

DETAILED DESCRIPTION OF THE INVENTION

Processes wherein the improvement according to the present invention are applicable include the previously described known procedure for preparing syndiotactic polystyrene, U.S. Pat. No. 4,680,353, the teachings of which are incorporated herein by reference. In addition to such processes for preparing syndiotactic polystyrene, the present invention may be utilized in combination with a mixture of styrene monomer and one or more olefins other than styrene, especially ethylene or propylene, to prepare substantially linear copolymers containing random distributions of styrene and said olefin remnants. Suitable catalysts for such process include the combination of (N-t-butylamino)(dimethyl)($\eta^5$-2,3,4,5-tetramethylcyclopentadienyl)silane zirconium dichloride with methylaluminoxane. Such catalysts are disclosed in the copending application Ser. No. 401,344, now abandoned, of David R Wilson and James C. Stevens, titled: Metal Coordination Complex, filed Aug. 31, 1989 and assigned to the same assignee as the present application. Additional catalysts especially useful in the Ziegler-Natta polymerization of mixtures of styrene and other olefins such as ethylene or propylene to produce linear random copolymers are zwitterionic species formed by reaction of at least one first component which is a mono(cyclopentadienyl) derivative of a metal of Group IIIB, IVB, VB, VIB, VIII or the Lanthanide Series of the Periodic Table of the Elements containing at least one substituent which will combine with the cation of a second component (described hereinafter) which first component is capable of forming a cation formally having a coordination number that is one less than its valence and at least one second component which is a salt of a Bronsted acid and a noncoordinating, compatible anion. This useful class of catalysts is further disclosed in the copending application Ser. No. 407,169, now abandoned, of James C. Stevens and David R. Neithamer, titled: Metal Complex Compounds, filed Sept. 14, 1989, and incorporated herein in its entirety by reference thereto.

In addition to olefins such as ethylene, propylene, 1-methylbutene, etc., the polymerization of the present invention may additionally include diolefins such as butadiene or isoprene, as well as additional vinylaromatic monomers such as alkyl or halo ring substituted styrene derivatives.

Ziegler-Natta catalysts for use according to the present invention preferably comprise:

1) a active catalyst species which is a metal of Group IIIB, IVB, VB, VIB, VIII or the Lanthanide Series of the Periodic Table of the Elements, and 2) a relatively large (bulky) associated group, capable of stabilizing the active catalyst species (the Group IIIB, IVB, VB, VIB, VIII or Lanthanide Series cation), said group being sufficiently labile to be displaced by the polymerizable monomer.

More preferred Ziegler-Natta catalysts for use according to the present invention comprise a transition metal compound containing at least one metal-O; metal-C; metal-N; metal-P: metal-S or metal-halogen bond and an organoaluminum compound containing at least one oxygen atom bound to the aluminum atom or located between two aluminum atoms. Highly preferred Ziegler-Natta catalysts for use in the preparation of styrene polymers having a high degree of syndiotacticity are titanium monocyclopentadienyl complexes, in particular monocyclopentadienyl titanium triphenoxides or trialkoxides having from 1 to 10 carbons in the alkyl group, in combination with methylaluminoxane. The use of such compositions in the preparation of styrene polymers is disclosed in copending application Ser. No. 64,282 filed June 17, 1987, now abandoned, and assigned to the same assignee as the present invention. The teachings of the foregoing application are herein incorporated in their entirety by reference thereto.

Such catalysts may be employed in either a supported or an unsupported manner. Suitable supports include silica and alumina. In a preferred embodiment the amount of transition metal compound to aluminum in the Ziegler-Natta catalyst may range from 0.001 to 1, preferably from 0.01 to 0.1.

The presence of phenylacetylene in styrene monomer used according to the present invention may be detected by standard techniques. One suitable technique is gas chromatography (GC). Styrene monomer may be obtained having levels of phenylacetylene as high as 150 parts per million or higher. According to the present technique it is possible to utilize such styrene monomer containing high levels of phenylacetylene in a Ziegler-Natta polymerization by the technique herein disclosed.

The styrene monomer is contacted with a hydrogenating agent, preferably hydrogen under hydrogenation conditions which are relatively mild so as to cause phenylacetylene hydrogenation but not to cause substantial hydrogenation of styrene. Suitably the hydrogenation may be conducted in the presence of a noble metal catalyst at moderate temperatures. Preferred noble metals include platinum or palladium optionally supported on an inert support such as aluminum, alumina or silica. Reduced copper catalysts may also be employed. Such catalysts particularly include those containing reduced copper on a support of γ-alumina which contains 50 percent by weight or less of α-alumina and less than 0.15 weight percent each of silicon as $SiO_2$ and sodium as $Na_2O$, and less that 0.01 percent iron as $Fe_2O_3$, and has a surface area of between about 68 and 350 $M^2g$ and wherein between about 98 and about 40 percent of the pores have a pore diameter between about 40 angstroms and 120 angstroms and not more than 25 percent nor less than 2 percent have a pore diameter between 1000 and 10,000 angstroms. These catalysts are more fully disclosed in U.S. Pat. No. 4,822,936, the teachings of which are incorporated herein in their entirety by reference thereto.

Suitable temperatures for the hydrogenation are from about 20° C. to 45° C., preferably from 22° C. to 30° C. After substantial hydrogenation of the phenylacetylene has occurred the monomer stream is contacted with the Ziegler-Natta catalyst under polymerization conditions. Utilizing the present technique, improved catalyst efficiencies, on the order of 50 to 1000 percent, are obtained compared to the use of styrene monomer which has not been treated to remove phenylacetylene. Catalyst efficiency is measured by the amount of polymer which results per weight catalyst.

Having described the invention, the following examples are provided to further illustrate the invention and are not to be construed as limiting. Unless stated to the contrary, parts and percentages are based on weight.

EXAMPLE 1

Styrene monomer was purified to remove water and other oxygen containing species by contacting with an activated alumina bed. The purified monomer was then hydrogenated using hydrogen gas to obtain a dissolved hydrogen level of about 1000 parts per million. The mixture was passed through a fixed bed of palladium on aluminum at room temperature. The phenylacetylene content after treatment in this manner was determined to be less than 1 part per million (the limit of detection by the gas chromatography instrument employed).

Aliquots of purified styrene monomer were then treated with known amounts of phenylacetylene to provide varying levels of contamination. The actual phenylacetylene level was then measured by gas chromatography. The samples were then subjected to a polymerization procedure in which 75 microliters of a 1.01 molar triisobutylaluminum/toluene solution, 75 microliters of a 1.0 molar methylaluminoxane/toluene solution and 38 microliters of a 0.01 molar cyclopentadienyltitanium tris-isopropoxide/toluene solution were added to the monomer. The combined solution was exposed to polymerization conditions (inert atmosphere, temperature 70° C.) for 1 hour and the resulting polymer, which had a high degree of syndiotactic structure, was dried to remove unpolymerized monomer. The percent conversion after 1 hour and efficiency in grams of polymer per grams of methylaluminoxane were calculated. Results are contained in Table 1.

TABLE 1

| Run | Phenylacetylene (ppm) | % Conversion | Efficiency (g/g) |
|---|---|---|---|
| 1 | <1 | 37.7 | 788 |
| 2 | 29 | 23.8 | 499 |
| 3 | 54 | 19.8 | 413 |
| 4 | 80 | 10.8 | 226 |
| 5 | 109 | 7.8 | 165 |
| 6 | 160 | 5.3 | 110 |
| 7 | 257 | 1.6 | 34 |

By reference to Table 1 it may be seen that improved conversions and efficiency of catalyst utilization is obtained by the polymerization of styrene monomer containing reduced amounts of phenylacetylene. Overall yield of polymer based on monomer is substantially unaffected by exposing the styrene monomer to hydrogenation conditions designed to obtain substantially complete hydrogenation of phenylacetylene while substantially avoiding hydrogenation of styrene monomer.

We claim:

1. A process for preparing improved yields of styrene polymers the steps of the process comprising:
   a) providing a monomer stream comprising styrene and contaminating amounts of phenylacetylene;
   b) contacting the monomer stream with a hydrogenating agent under hydrogenation conditions such that substantially all the phenylacetylene is hydrogenated without substantial hydrogenation of styrene;
   c) contacting the monomer stream with a catalyst comprising a titanium monocyclopentadienyl complex under polymerization conditions, so as to cause at least partial polymerization of styrene; and
   d) recovering the resulting styrene polymer.

2. A process according to claim 1 wherein the hydrogenation is conducted by contacting the monomer stream with a noble metal or reduced copper catalyst in the presence of a hydrogenating agent at a temperature from 20° C. to 45° C.

3. A process according to claim 2 wherein the hydrogenating agent is hydrogen gas.

4. A process according to claim 3 wherein the temperature is from 22° C. to 30° C.

5. A process according to claim 1 wherein the catalyst comprises a titanium monocyclopentadienyl complex compound containing at least one metal-O; metal-C; metal-N; metal-P; metal-S or metal-halogen bond and an organoaluminum compound containing at least one oxygen atom bound to the aluminum atom or located between two aluminum atoms.

6. A process according to claim 5 wherein the catalyst comprises cyclopentadienyltitanium triisopropoxide and methylaluminoxane.

7. A process according to claim 1 wherein a mixture of styrene monomer and one or more olefin monomers other than styrene is polymerized.

* * * * *